(12) United States Patent
Kire

(10) Patent No.: US 6,400,367 B2
(45) Date of Patent: *Jun. 4, 2002

(54) CHARACTER DISPLAY DEVICE AND DISPLAYING METHOD THEREOF

(75) Inventor: Hiroshi Kire, Hyogo (JP)

(73) Assignees: Mitsubishi Electric Systems LSI Design Corporation, Itami; Mitsubishi Denki Kabushiki Kaisha, Tokyo, both of (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/291,954

(22) Filed: Apr. 15, 1999

(30) Foreign Application Priority Data

Nov. 27, 1998 (JP) .......................................... 10-338177

(51) Int. Cl.⁷ ................................................. G09G 5/22
(52) U.S. Cl. ....................................... 345/467; 345/213
(58) Field of Search ................................. 345/141, 114, 345/26, 192, 127, 128, 467–469, 204, 211, 213; 348/586, 563, 564

(56) References Cited

U.S. PATENT DOCUMENTS

| | | | | |
|---|---|---|---|---|
| 4,467,322 A | * | 8/1984 | Bell et al. ...................... | 345/22 |
| 5,195,180 A | * | 3/1993 | Takakura et al. ............ | 345/114 |
| 5,400,052 A | * | 3/1995 | Otake et al. ................. | 345/127 |
| 5,608,424 A | * | 3/1997 | Takahashi et al. ........... | 345/141 |
| 5,929,839 A | * | 7/1999 | Matsumoto et al. ......... | 345/141 |
| 6,091,459 A | * | 7/2000 | Masaike ....................... | 348/569 |

FOREIGN PATENT DOCUMENTS

| | | | | |
|---|---|---|---|---|
| JP | 07046551 A | * | 2/1995 | ............ H04N/7/03 |
| JP | 9270970 | | 10/1997 | |

* cited by examiner

Primary Examiner—Richard Hjerpe
Assistant Examiner—Alexander Eisen
(74) Attorney, Agent, or Firm—Leydig, Voit & Mayer, Ltd.

(57) ABSTRACT

A character display device includes a memory for storing on-screen display (OSD) character data and wallpaper (background) character data, and shift registers for outputting the corresponding one of those character data stored in the memory in accordance with a command to display one of the OSD character data and of the wallpaper character data. The character display device combines the OSD character data and the wallpaper character data using of a mixer, when the timing for displaying the OSD character data and that for displaying the wallpaper character data coincide with each other, so that both character data can be displayed in a superimposed manner.

6 Claims, 5 Drawing Sheets

CHARACTER DISPLAY DEVICE AND DISPLAYING METHOD THEREOF

BACKGROUND OF THE INVENTION

1. Field of the Invention

The present invention relates to a character display device for displaying characters for OSD (On-Screen Display), which are generally used for indicating the number of a channel currently being received, the current sound volume and so forth on a TV screen or the like, and, more particularly, to a character display device displaying a wallpaper character (background image or background character) on the whole screen as well as the characters for OSD, together with the character displaying method thereof. displaying method thereof.

2. Description of the Related Art

Figure 5:
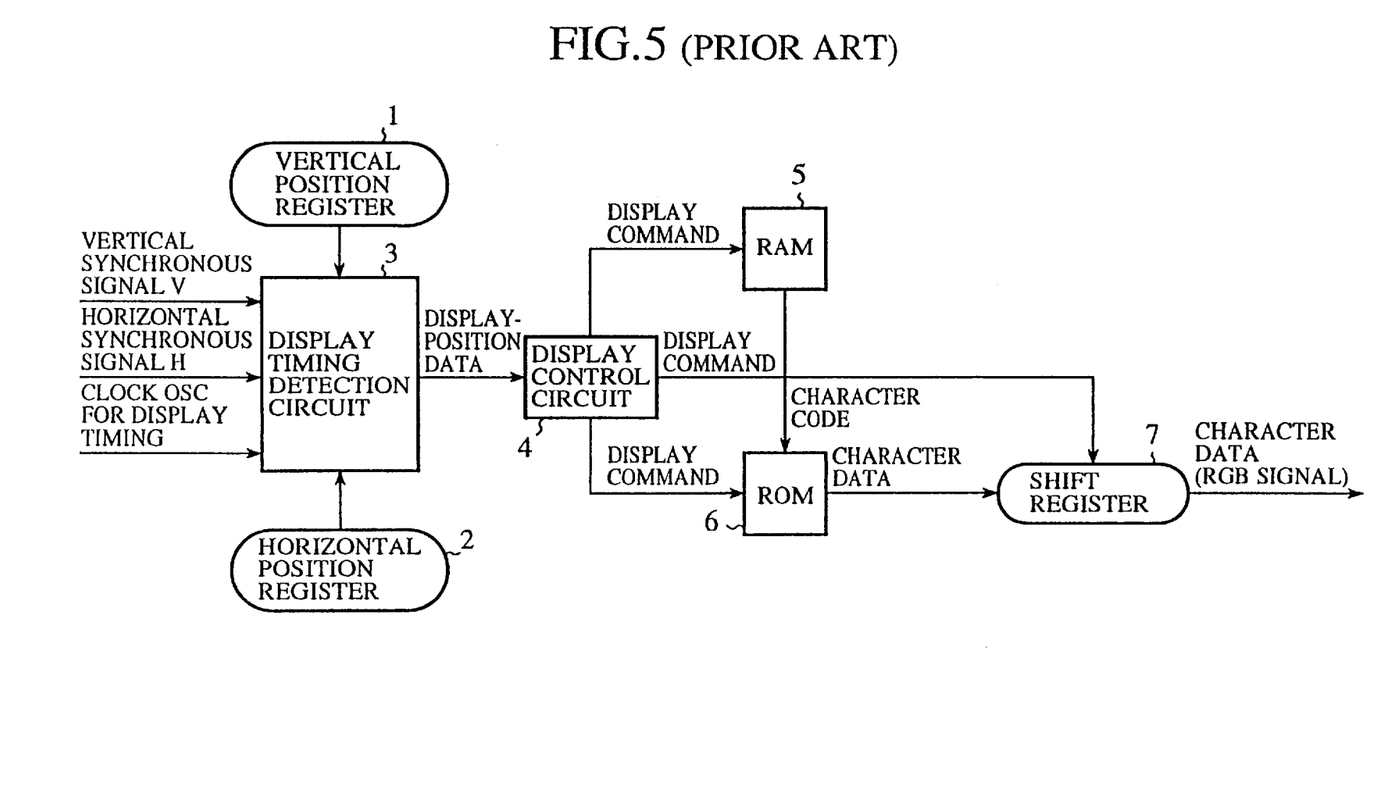
FIG. 5 is a schematic view illustrating a fundamental configuration of the conventional character display device.

FIG. 5 is a schematic view showing a fundamental configuration of a conventional character display device. In the figure, reference numeral 1 denotes a vertical position register for storing the vertical displaying position of the characters for OSD (hereinafter refereed to just as "OSD characters"), numeral 2 denotes a horizontal position register for storing the horizontal displaying position of the OSD characters, and numeral 3 denotes a display timing detection circuit which detects the timing for displaying each of the OSD characters through a counting operation of the horizontal synchronous signals H and the vertical synchronous signals V, and outputs a data indicating displaying position (or just "display-position data" hereinafter) for each of the OSD characters. Further, reference numeral 4 denotes a display control circuit which outputs a command signal to display (hereinafter refereed to just as a "display command signal"), whenever the display timing detection circuit 3 outputs the display-position data.

Reference numeral 5 denotes a RAM which stores character codes for one or more OSD characters, and outputs the corresponding one of the stored character codes when it receives a display command signal from the display control circuit 4. Reference numeral 6 denotes a ROM, which, on receiving the character code from the RAM 5, outputs a character data specified by the thus received character code. Reference numeral 7 denotes a shift register which synchronizes with the display command signal sent from the display control circuit 4, and inputs and/or outputs the character data received from the ROM 6.

The operational movement of the above-described conventional character display device is as follows.

First, the display timing detection circuit 3 counts the number of horizontal synchronous signals HL and vertical synchronous signals V to obtain the current scanning position on the screen, in order to detect the timing for displaying the OSD characters.

Thereafter, the display timing detection circuit 3 compares the thus obtained current scanning position on the screen and the displaying position of each of the OSD characters, (which position is deduced from the stored value in the vertical position register 1 and that in the horizontal position register 2), and outputs the display-position data for each of the OSD characters when they coincide with each other.

When the display control circuit 4 receives the display-position data from display timing detection circuit 3, it outputs display command signals respectively to the RAM 5, the ROM 6 and to the shift register 7, in order to produce the OSD character corresponding to the display-position data.

Thereafter, when the RAM 5 receives the display command signal from the display control circuit 4, it outputs a character code corresponding to the display-position data to the ROM 6.

In this way, when the character code corresponding to the display-position data is outputted from the RAM 5, the ROM 6 outputs a character data specified by the character code, such as a letter data, picture data and so on, to the shift register 7.

Then, the shift register 7 inputs and/or outputs the character data, synchronizing with the display command signal outputted from the display control circuit 4, and when the character data is outputted from the shift register 7, an OSD character is sent out on the basis of the thus outputted character data.

Since the conventional character display device is configured as explained above, OSD characters can be displayed in any arbitrary position on a display screen. However, there has been no means provided for displaying a wallpaper on the whole display screen.

SUMMARY OF THE INVENTION

The present invention has been achieved in consideration of the aforementioned, and it is an object of the present invention to provide a character display device, which is capable not only of displaying an OSD character in any arbitrary position of the display device, but of displaying a wallpaper on the whole screen, together with a character displaying method.

In order to achieve the above object, the character display device according to the present invention comprises: control means for controlling timing for displaying OSD characters and wallpaper characters, through counting horizontal synchronous signals and vertical synchronous signals; storing means for storing character data for OSD characters and for wallpaper; and output means for outputting, upon receiving a command to display either one of the OSD characters or the wallpaper characters, the corresponding character data stored in the storing means.

In the above configuration, the output means combines the character data for OSD characters and character data for the wallpaper, when the timing for displaying OSD characters and wallpaper characters coincide with each other.

The character display device according to the present invention constructed as above is further provided with at least one of a first and second setting means; respectively, for setting the number of dots for a wallpaper character in the horizontal direction and in the vertical direction.

The character displaying method provided for accomplishing the above object comprises of: counting horizontal synchronous signals and vertical synchronous signals to control the timing for displaying OSD characters and wallpaper characters; and outputting, upon receiving a command to display either one of an OSD characters or a wallpaper character, a corresponding one of the OSD character and wallpaper stored in a storing means.

The above character displaying method further comprises combining the character data for OSD characters and character data for wallpaper characters, when the timing for displaying OSD characters and wallpaper characters coincide with each other.

The character displaying method according to the present invention further comprises preliminarily setting the number of dots for wallpaper character in at least one of the horizontal and vertical directions.

As explained above, according to the first aspect of the present invention, since the character display device is configured such that there is provided an output means which, when the control means outputs a character display command signal, outputs either the character data for an OSD character or that for a wallpaper character, both stored in the storing means, not only an OSD character can be displayed in any arbitrary position on the screen, but wallpaper can also be displayed on the whole screen.

According to the second aspect of the present invention, since the character display device is configured such that there is provided an output means which, when timing for displaying an OSD character and that for displaying a wallpaper character coincide with each other, combines the character data for the OSD character and that for the wallpaper character, so that both character data are displayed in a superimposed manner.

Further, according to the third aspect of the present invention, since the character display device is configured such that there is provided at least one of a first and second setting means; respectively, for setting the number of dots in the horizontal and vertical directions of the wallpaper character, the picture of the wallpaper can be finely adjusted.

Further according to the fourth aspect of the present invention, since the character displaying method is arranged such that when the timing for displaying either one of the OSD character or wallpaper character is detected, either the character data for an OSD character or that for a wallpaper character both stored in a memory is outputted, not only an OSD character can be displayed in any arbitrary position on the screen, but a wallpaper can also be displayed on the whole screen.

Still further, according to the fifth aspect of the present invention, since the character displaying method is arranged such that when the timing for displaying the OSD character and that for displaying a wallpaper character coincide with each other, the character data for the OSD character and that for the wallpaper character are combined, and both data can be displayed in a superimposed manner.

Yet still further, according to the sixth aspect of the present invention, since the character displaying method is arranged such that the number of dots for wallpaper characters are preliminarily set in at least one of the horizontal and vertical directions, the picture of the wallpaper can be finely adjusted.

DETAILED DESCRIPTION OF THE PREFERRED EMBODIMENTS

Several embodiments of the present invention will now be described with reference to the attached figures.

[First Embodiment]

Figure 1:
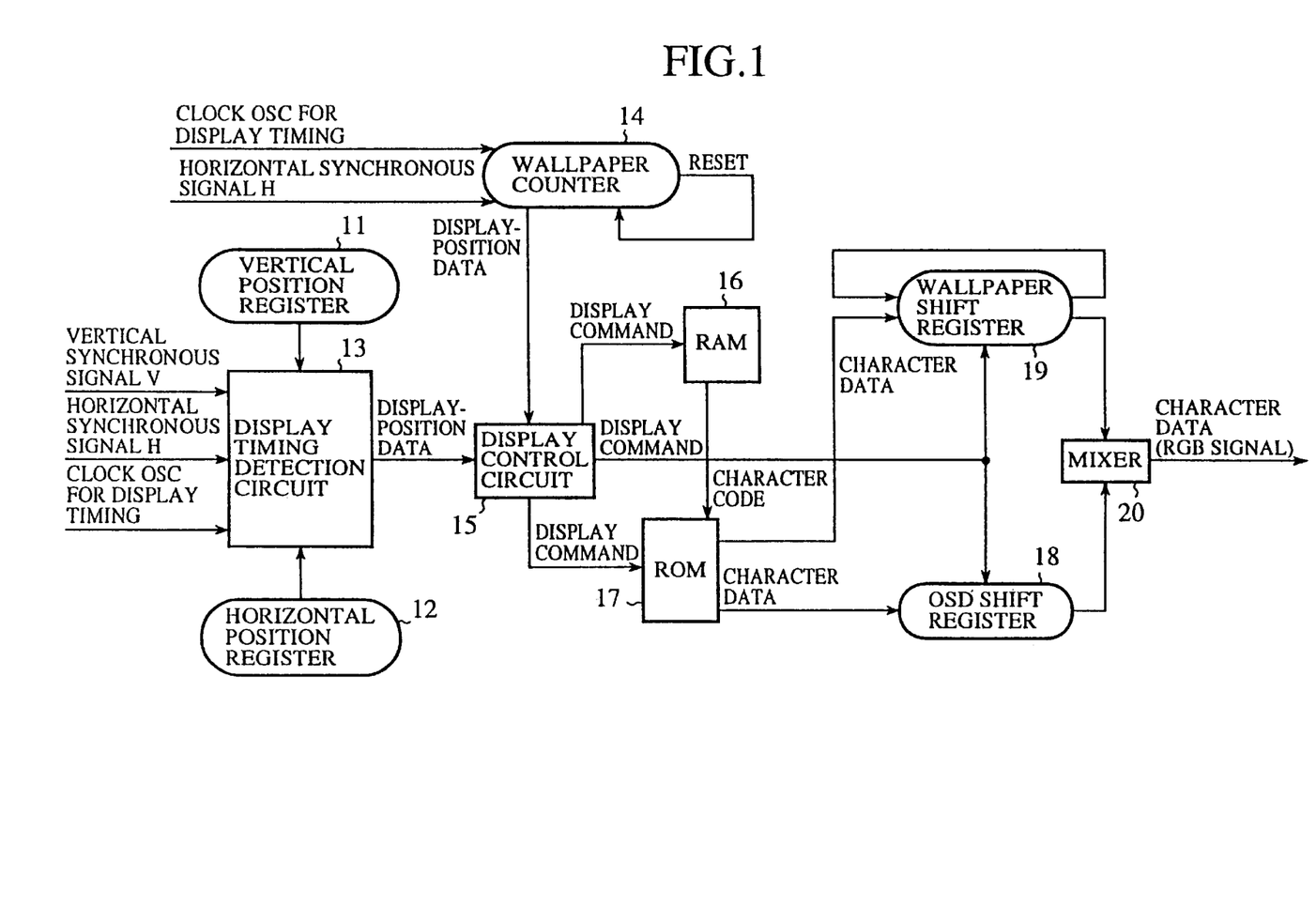
FIG. 1 is a schematic view illustrating a general configuration of the character display device according to a first embodiment of the present invention.

FIG. 1 is a schematic view illustrating a general configuration of the character display device according to a first embodiment of the present invention. In FIG. 1, reference numeral 11 denotes a vertical position register (control means) for storing the vertical displaying positions of the OSD characters, numeral 12 denotes a horizontal position register (control means) for storing the horizontal displaying positions of the OSD characters, and numeral 13 denotes a display timing detection circuit (control means) which detects the timing for displaying each of the OSD characters through a counting operation of the horizontal synchronous signals H and vertical synchronous signals V, and outputs display-position data for each of the OSD characters. Further, reference numeral 14 denotes a counter for wallpaper (control means) which counts up the number of horizontal synchronous signals H, and outputs display-position data for each of the wallpaper characters, and reference numeral 15 denotes a display control circuit (control means) which outputs a display command signal whenever either one of the display timing detection circuit 13 and the counter for wallpaper 14 (abbreviated hereinafter to a "wallpaper counter") outputs a display-position data.

Reference numeral 16 denotes a RAM (storing means) which stores character codes for one or more OSD characters and for wallpaper characters, and outputs corresponding ones of the stored character codes when it receives a display command signal from the display control circuit 15. Reference numeral 17 denotes a ROM (storing means) which, on receiving the character code from the RAM 16, outputs a character data specified by the thus received character code, numeral 18 denotes a shift register for OSD characters (output means) which synchronizes with the display command signal sent from the display control circuit 15, and inputs and/or outputs the character data for an OSD character received from the ROM 17, numeral 19 denotes a shift register for wallpaper characters (output means) which inputs and/or outputs the character data for a wallpaper character received from the ROM 17, synchronizing with the display command signal sent from the display control circuit 15, and reference numeral 20 denotes a mixer (output means) that combines the OSD character data for an OSD character and the wallpaper character data for a wallpaper character to output composite data.

Figure 2:
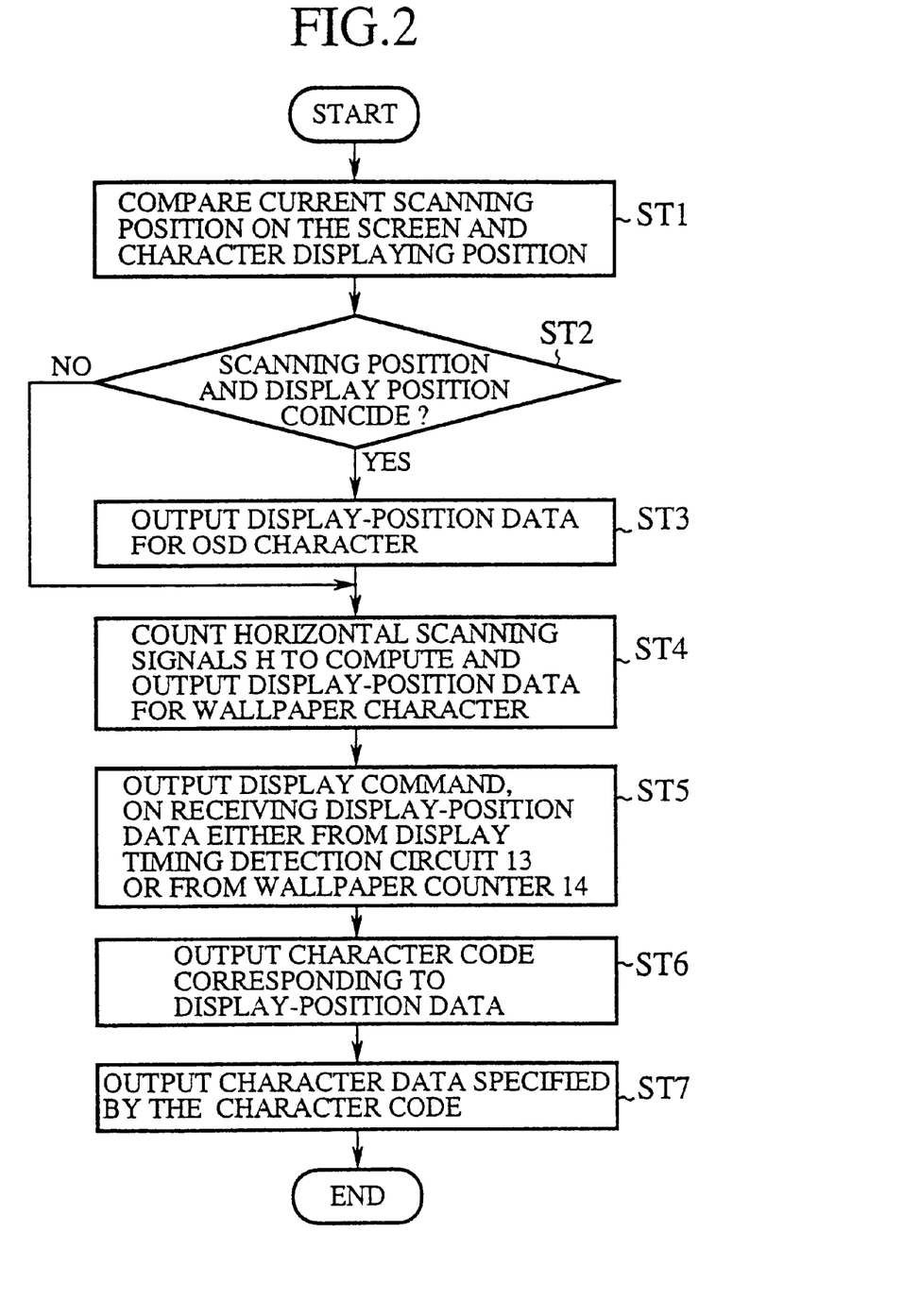
FIG. 2 is a flow chart showing a character displaying method for use with the first embodiment of the present invention.

FIG. 2 shows a flow chart showing the method of displaying characters for use with the above display device of the present invention.

The operational movement of the above-described character display device is as follows.

First, the display timing detection circuit 13 counts the number of horizontal synchronous signals H and vertical synchronous signals V to obtain the current scanning position on the screen, in order to detect the timing for displaying the OSD characters.

Thereafter, in step ST1, the display timing detection circuit 13 obtains the displaying position for each of the OSD characters from the stored value in the vertical position register 11 and that in the horizontal position register 12, and compares the displaying position of the OSD characters and the current scanning position on the screen, and outputs the display-position data for each of the OSD characters when they coincide with each other as shown in steps ST2 and ST3.

On the other hand, in step ST4, the wallpaper counter 14 increments the counted value each time it receives the horizontal synchronous signals H, and calculates the display-position data for each of the wallpaper characters from the thus counted value. It should be noted that the wallpaper counter 14 is reset each time it counts the horizontal synchronous signals H for one vertical letter-size width of the wallpaper character, and repeats it until the scanning movement for one whole screen is finished.

Further, the wallpaper counter 14 is reset by the vertical synchronous signals V in order to put the wallpaper characters at the same vertical positions on each updated screen.

Thereafter, in step ST5, the display control circuit 15 outputs, upon receiving display-position data from the display timing detection circuit 13, a display command signal to the RAM 16, the ROM 17 and to the shift register 18, in order to obtain the OSD character corresponding to the display-position data, and the display control circuit 15 also outputs a display command signal with respect to the RAM 16, the ROM 17 and to the wallpaper shift register 19, upon receiving a display-position data from the wallpaper counter 14.

Then, in step ST6, when the RAM 16 receives the display command signal from the display control circuit 15, it outputs a character code corresponding to the display-position data to the ROM 17.

In this way, when the character code corresponding to the display-position data is outputted from the RAM 16, the ROM 17 outputs a character data specified by the character code, such as a letter data, picture data and so on, either to the OSD shift register 18 or to the wallpaper shift register 19, depending on the character code sent to the ROM 17.

Thereafter, when the OSD shift register 18 receives the display command signal outputted from the display control circuit 15 (in a case in which the display timing detection circuit 13 outputs display-position data), it synchronizes with the display command signal and inputs and/or outputs the character data, whereas when the wallpaper shift register 19 receives the display command signal from the display control circuit 15 (in a case in which the wallpaper counter 14 outputs a display-position data), it synchronizes with the display command signal and inputs and/or outputs the character data.

In the above case, however, when the wallpaper shift register 19 outputs character data for the wallpaper character from the last stage thereof, it shifts back the same character data to the first stage of the wallpaper shift register 19, and repeats the wallpaper character during the whole one horizontal scanning movement.

Then, when the OSD shift register 18 or the wallpaper shift register 19 outputs one of the character data, the mixer 20 outputs the thus outputted character data to display either an OSD character or a wallpaper character, in step ST7. However, when the character data are outputted simultaneously from the OSD shift register 18 and the wallpaper shift register 19, those character data are combined before being further outputted.

As explained heretofore, according to the first embodiment of the present invention, as it is configured in such a manner that when the display control circuit 15 outputs a display command signal, either one of the OSD character data and the wallpaper character data is outputted, so not only the OSD characters can be displayed in any arbitrary position on the screen, but wallpaper can be displayed simultaneously on the whole screen.

[Second Embodiment]

Figure 3:
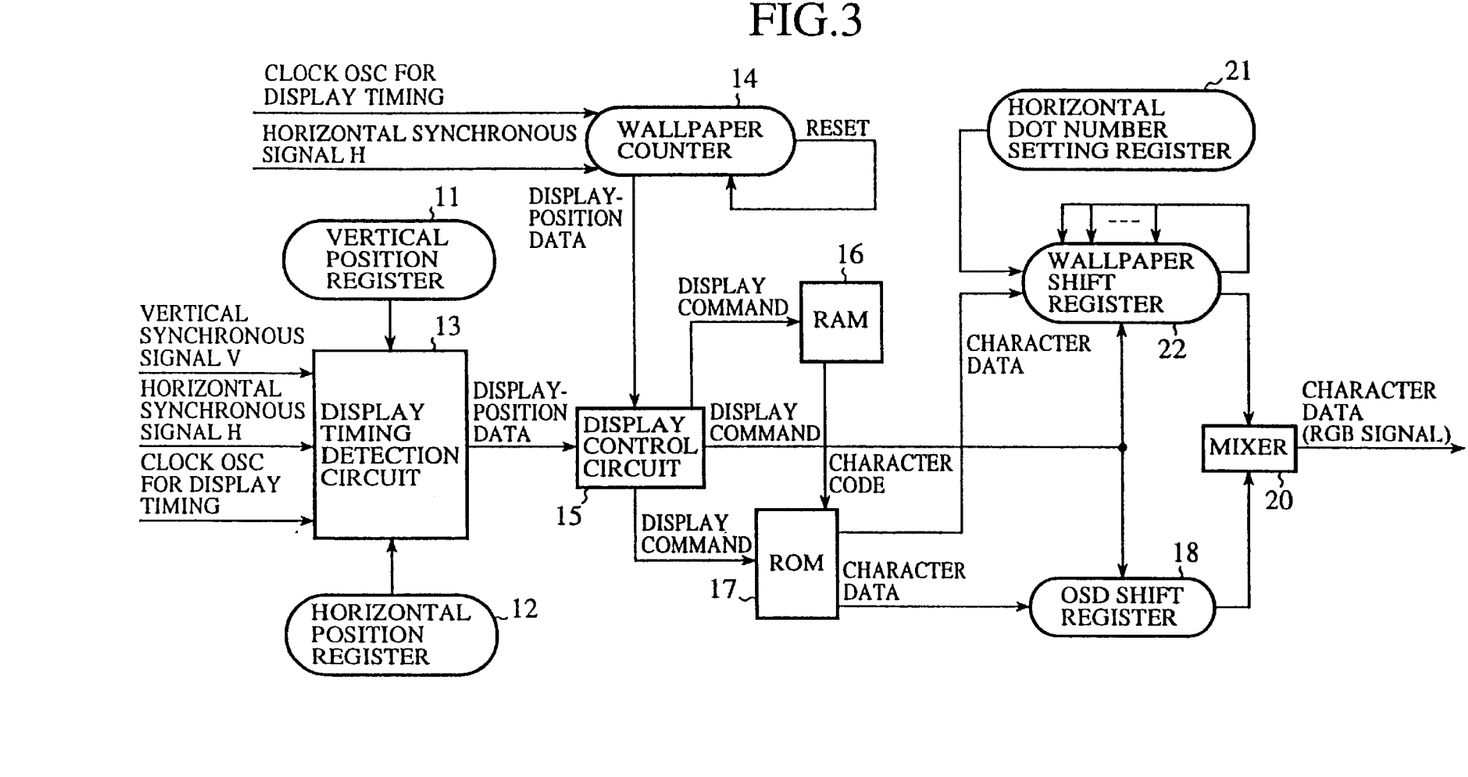
FIG. 3 is a schematic view illustrating a general configuration of the character display device according to a second embodiment of the present invention.

FIG. 3 is a schematic view illustrating a general configuration of the character display device according to a second embodiment of the present invention. In the figure, since the same reference numerals as those used in FIG. 1 indicate either identical or corresponding portions, repeated explanation is omitted. Reference numeral 21 denotes a horizontal number setting register for setting the number of dots in the horizontal direction for the wallpaper characters (setting means), reference numeral 22 denotes a wallpaper shift register (outputting means) which synchronizes with the display command signal outputted from the display control circuit 15, and inputs and/or outputs character data for wallpaper characters. The wallpaper shift register 22 operates such that the output character from the last stage thereof is returned to a position corresponding to the set value in the horizontal dot number setting register 21.

The operational movement of the character display device according to the second embodiment is as follows.

In the first embodiment, when the wallpaper shift register 19 outputs character data for a wallpaper character from the last stage thereof, the same character data is returned to the first stage of the wallpaper shift register 19. However, it can also be arranged such that the position to which the character data is to be returned, in other words, the position in the wallpaper shift register 19 to which the same character data is to be inputted, is set by use of the horizontal dot number setting register 21.

By this arrangement, the number of dots in the lateral direction of the character data can be arbitrarily set, so that the picture based on the wallpaper character can be finely adjusted.

[Embodiment 3]

Figure 4:
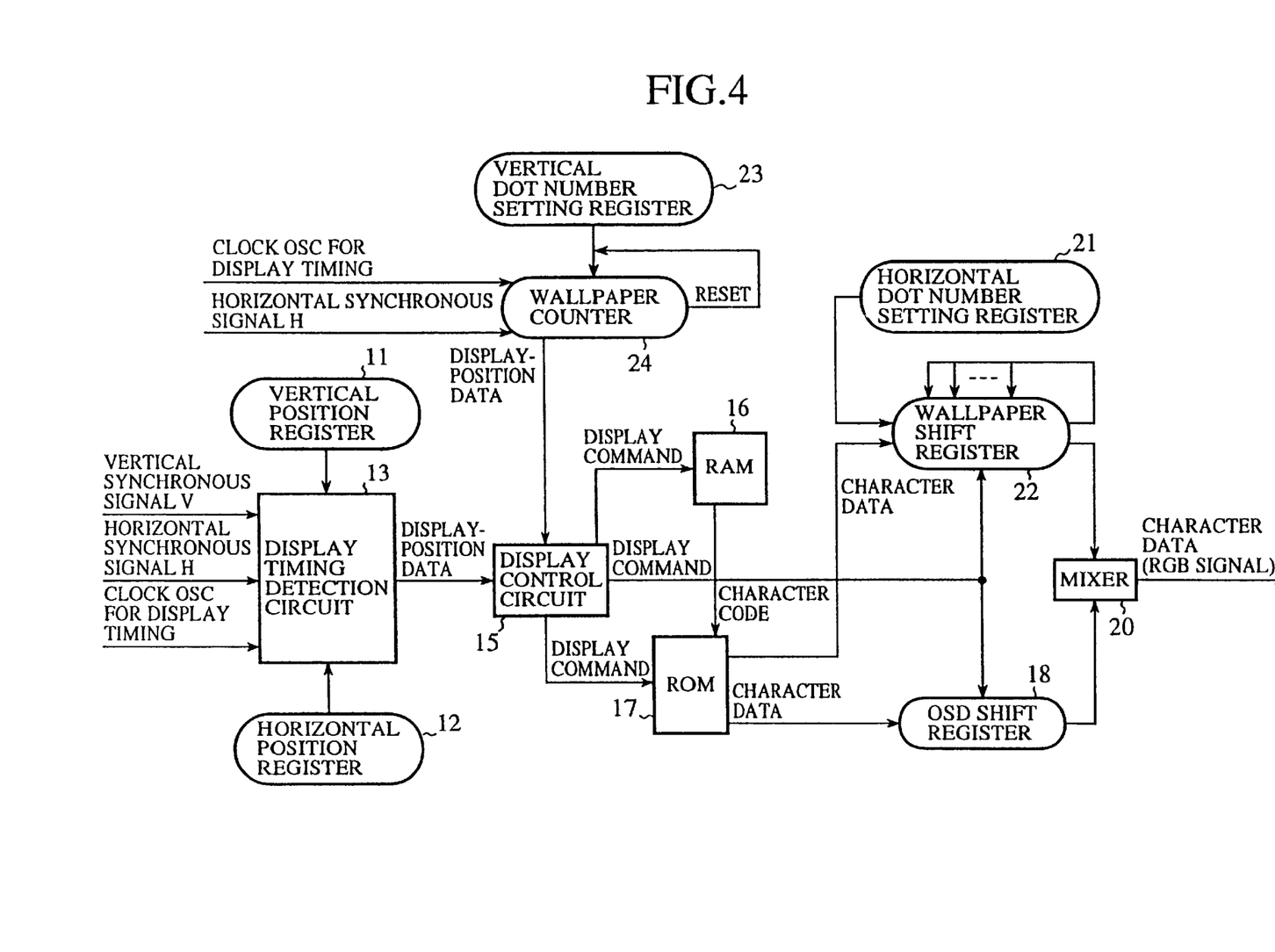
FIG. 4 is a schematic view illustrating a general configuration of the character display device according to a third embodiment of the present invention.

FIG. 4 is a schematic view illustrating a general configuration of the character display device according to a third embodiment of the present invention. In the figure, since the same reference numerals as those used in FIG. 3 indicate either identical or corresponding portions, repeated explanation is omitted. In the figure, reference numeral 23 denotes a vertical dot setting register for setting the number of dots for displaying the wallpaper character in the vertical direction, reference numeral 24 denotes a wallpaper counter (control means) which counts up the horizontal synchronous signals H, and outputs a display-position data for each of the wallpaper characters, wherein the wallpaper counter 24 resets the counted value in accordance with the value set in the vertical dot setting register 23.

The operational movement of the character display device according to the third embodiment is as follows.

In the above second embodiment, it is arranged such that the position to which the character data is to be returned is set by use of the horizontal dot number setting register 21. However, it can also be arranged such that the upper limit value of the wallpaper counter 24 is set by use of the vertical dot number setting register 23.

By this arrangement, the number of dots in the longitudinal direction of the character data can be arbitrarily set, so that, for example, the picture based on the wallpaper characters can be finely adjusted.

What is claimed is:

1. A character display device comprising:
control means for controlling timing for displaying on-screen display (OSD) characters and wallpaper characters on the character display device, by counting horizontal synchronous signals and a dot clock, the character display device producing a display by tracing horizontal lines, corresponding to the horizontal synchronous signals, and moving vertically synchronously with the dot clock, respective dots being arrayed along the horizontal lines on the character display device;

storing means for storing character data for OSD characters and for wallpaper characters;

output means for outputting, in response to a command to display at least one of the OSD characters and the wallpaper characters, a corresponding one of the character data for OSD characters and for wallpaper characters stored in said storing means, said output means combining the character data for OSD characters and the character data for wallpaper characters when times for displaying OSD characters and wallpaper characters coincide, and including
- a first register for receiving and outputting the character data for OSD characters, and
- a second register for receiving and outputting the character data for wallpaper characters, the character data for OSD characters and for wall paper characters being sent from said storing means; and setting means communicating with the second register for adjusting number of the dots on the character display device for a wallpaper character along the horizontal direction for freely adjusting width within which the wallpaper character is repetitively displayed on the character display device.

2. The character display device according to claim 1, wherein the character data outputted from a last stage of said second register returns to a position in said second register, the position being designated by the number set in said setting means.

3. A character display device comprising:

control means for controlling timing for displaying on-screen display (OSD) characters and wallpaper characters on the character display device, by counting horizontal synchronous signals and a dot clock, the character display device producing a display by tracing horizontal lines, corresponding to the horizontal synchronous signals, and moving vertically synchronously with the dot clock, respective dots being arrayed along the horizontal lines on the character display device;

storing means for storing character data for OSD characters and for wallpaper characters;

output means for outputting, in response to a command to display at least one of the OSD characters and the wallpaper characters, a corresponding one of the character data for OSD characters and for wallpaper characters stored in said storing means, said output means combining the character data for OSD characters and the character data for wallpaper characters when times for displaying OSD characters and wallpaper characters coincide, and including
- a first register for receiving and outputting the character data for OSD characters, and
- a second register for receiving and outputting the character data for wallpaper characters, the character data for OSD characters and for wall paper characters being sent from said storing means; and setting means communicating with the control means for adjusting number of the dots on the character display device for a wallpaper character along the vertical direction for freely adjusting height within which the wallpaper character is repetitively displayed on the character display device.

4. The character display device according to claim 3, wherein the character data outputted from a last stage of said second register returns to a position in said second register, the position being designated by the number set in said setting means.

5. The character display device according to claim 3, wherein said setting means communicates with the second register for adjusting the number of dots on the character display device for a wallpaper character along the horizontal direction for freely adjusting width within which the wallpaper character is repetitively displayed on the character display device.

6. A character displaying method comprising:

counting horizontal synchronous signals and a dot clock to control timing for displaying on-screen display (OSD) characters and wallpaper characters on a character display device producing a display by tracing horizontal lines corresponding to the horizontal synchronous signals and synchronously with the dot clock, respective dots being arranged along the horizontal lines on the character display device;

outputting, in response to a command to display at least one of the OSD characters and one of the wallpaper characters, characters data stored in a storing means and corresponding to the at least one of the OSD character and the wallpaper character;

combining the character data for an OSD character and a wallpaper character when timing for displaying an OSD character and a wallpaper character coincide; and preliminarily setting the number of the dots on the character display device in at least one of the horizontal and vertical directions to freely adjust at least one of width and height within which the wallpaper character is repetitively displayed on the character display device.

* * * * *

UNITED STATES PATENT AND TRADEMARK OFFICE
CERTIFICATE OF CORRECTION

PATENT NO. : 6,400,367 B2
DATED : June 4, 2002
INVENTOR(S) : Hiroshi Kire

It is certified that error appears in the above-identified patent and that said Letters Patent is hereby corrected as shown below:

<u>Title page,</u>
Item [73], Assignees, change "Systems" to -- System --.

Signed and Sealed this

First Day of October, 2002

*Attest:*

*Attesting Officer*

JAMES E. ROGAN
*Director of the United States Patent and Trademark Office*